(12) United States Patent
Sakamoto

(10) Patent No.: US 11,429,678 B2
(45) Date of Patent: Aug. 30, 2022

(54) DOCUMENT COMPARISON SYSTEM

(71) Applicant: Honda Motor Co., Ltd., Tokyo (JP)

(72) Inventor: Daisuke Sakamoto, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 224 days.

(21) Appl. No.: 17/023,403

(22) Filed: Sep. 17, 2020

(65) Prior Publication Data

US 2021/0089596 A1    Mar. 25, 2021

(30) Foreign Application Priority Data

Sep. 18, 2019  (JP) .............................. JP2019-169708

(51) Int. Cl.
*G06F 16/93* (2019.01)
*G06F 40/253* (2020.01)
*G06F 16/583* (2019.01)
*G06V 30/416* (2022.01)

(52) U.S. Cl.
CPC .......... *G06F 16/93* (2019.01); *G06F 16/5846* (2019.01); *G06F 40/253* (2020.01); *G06V 30/416* (2022.01)

(58) Field of Classification Search
None
See application file for complete search history.

(56) References Cited

U.S. PATENT DOCUMENTS

| | | | |
|---|---|---|---|
| 7,958,136 B1 * | 6/2011 | Curtis ................... | G06F 16/313 707/758 |
| 10,599,722 B1 * | 3/2020 | Ewing .................... | G06F 16/93 |
| 2010/0242023 A1 * | 9/2010 | Han ........................ | G06F 21/12 717/124 |
| 2014/0101171 A1 * | 4/2014 | Danielyan ............. | G06F 40/284 707/E17.058 |
| 2017/0109326 A1 * | 4/2017 | Tan .......................... | G09B 7/02 |
| 2020/0226206 A1 * | 7/2020 | Brake ..................... | G06F 40/30 |

FOREIGN PATENT DOCUMENTS

WO    2007057945    5/2007

OTHER PUBLICATIONS

Sediyono, Agung, and Ku Ruhana Ku-Mahamud. "Algorithm of the longest commonly consecutive word for plagiarism detection in text based document." In 2008 Third International Conference on Digital Information Management, pp. 253-259. IEEE, 2008. (Year: 2008).*

* cited by examiner

*Primary Examiner* — Frank D Mills
(74) *Attorney, Agent, or Firm* — JCIPRNET

(57) ABSTRACT

The disclosure provides a system that can easily calculate a similarity rate of a target document when comparing the target document. An array set of a designated type of words (e.g., nouns) is respectively extracted from a test document and a reference document as an arrayed test document and an arrayed reference document. A word included in a common word set of the arrayed test document and the arrayed reference document is defined as true as a proposition, and other words are defined as false as propositions. Further, when a ratio of words defined as true as propositions in a word array of a first designated length including a word among words defined as false as propositions is greater than or equal to a first designated value, the word is redefined as a wildcard and true as a proposition.

12 Claims, 18 Drawing Sheets

| | |
|---|---|
| Test document Dt | ここで主張しておきたいことは、私が小学生だったときからやってきたサッカーを通して、私は自分の目標を達成する喜び、そしてゲームを失うことの悔しさを経験したことです。非常に良い経験であったと思っています。(The thing that I would like to argue at here is that through soccer which I played when I was an elementary school student, I experienced the joy of achieving my goals and the regret of losing the game. I think it was a particularly good experience.) |
| Reference document Dr | 10年以上前の話になりますが、私は小学生だったときからやってきた野球を通して、私は自分の目標を達成する「喜び」と「悔しさ」を経験しました。これらの経験はその後の人生に大きな影響を与えているということは言及するまでもありません。(Though being for a story of more than 10 years earlier, through baseball which I played when I was an elementary school student, I experienced the "joy" of achieving my goals and the "regret" of losing the game. It goes without saying that these experiences have a great influence on my life following it.) |

FIG. 3A

| nt | nr |
|---|---|
| 経験 | 言及 |
| 非常 | こと |
| 経験 | 影響 |
| 悔しさ | 人生 |
| こと | 私 |
| ゲーム | その後 |
| 喜び | 経験 |
| 達成 | これら |
| 目標 | 経験 |
| 自分 | 悔しさ |
| 私 | こと |
| サッカー | ゲーム |
| とき | 喜び |
| 小学生 | 達成 |
| 私 | 目標 |
| こと | 自分 |
| 主張 | 私 |
| ここ | 野球 |
| | とき |
| | 小学生 |
| | 私 |
| | 話 |
| | 前 |
| | 以上 |
| | 年 |
| | 10 |

| nt | 私 | 小学生 | とき | サッカー | 私 | 自分 | 目標 | 達成 | 喜び | ゲーム | こと | 悔しさ | 経験 | 非常 | 経験 |
|---|---|---|---|---|---|---|---|---|---|---|---|---|---|---|---|
| Ft | F | T | T | T | F | T | T | T | T | T | T | T | T | T | F | T |

| nr | 10 | 年 | 以上 | 前 | 話 | 私 | 小学生 | とき | 野球 | 私 | 自分 | 目標 | 達成 | 喜び | ゲーム | こと | 悔しさ | 経験 | これら | 経験 | その後 | 私 | 人生 | 影響 | こと | 言及 |
|---|---|---|---|---|---|---|---|---|---|---|---|---|---|---|---|---|---|---|---|---|---|---|---|---|---|---|
| Fr | F | F | F | F | F | T | T | T | F | T | T | T | T | T | T | T | T | T | F | T | F | T | F | F | T | F |

FIG. 5A

| nt | Ft |
|---|---|
| 経験 | T |
| # | T |
| 経験 | T |
| 悔しさ | T |
| こと | T |
| ゲーム | T |
| 喜び | T |
| 達成 | T |
| 目標 | T |
| 自分 | T |
| 私 | T |
| # | T |
| とき | T |
| 小学生 | T |
| 私 | T |
| こと | T |
| 主張 | F |
| こと | F |

| nr | Fr |
|---|---|
| 言及 | F |
| こと | F |
| 影響 | F |
| 人生 | F |
| 私 | T |
| # | T |
| 経験 | T |
| # | T |
| 経験 | T |
| 悔しさ | T |
| こと | T |
| ゲーム | T |
| 喜び | T |
| 達成 | T |
| 目標 | T |
| 自分 | T |
| 私 | T |
| # | T |
| とき | T |
| 小学生 | T |
| 私 | T |
| 話 | F |
| 前 | F |
| 以上 | F |
| 年 | F |
| 10 | F |

FIG. 5B

| nt | Ft |
|---|---|
| 経験 | T |
| # | T |
| 経験 | T |
| 悔しさ | T |
| こと | T |
| ゲーム | T |
| 喜び | T |
| 達成 | T |
| 目標 | T |
| 自分 | T |
| 私 | T |
| # | T |
| とき | T |
| 小学生 | T |
| 私 | T |
| こと | T |
| 主張 | F |
| ここ | F |

| nr | Fr |
|---|---|
| 言及 | F |
| こと | F |
| 影響 | F |
| 人生 | F |
| 私 | T |
| # | T |
| 経験 | T |
| # | T |
| 経験 | T |
| 悔しさ | T |
| こと | T |
| ゲーム | T |
| 喜び | T |
| 達成 | T |
| 目標 | T |
| 自分 | T |
| 私 | T |
| # | T |
| とき | T |
| 小学生 | T |
| 私 | T |
| 話 | F |
| 前 | F |
| 以上 | F |
| 年 | F |
| 10 | F |

FIG. 5C

| nt* | nr* |
|---|---|
| 経験 | 私 |
| # | # |
| 経験 | 経験 |
| 悔しさ | # |
| こと | 経験 |
| ゲーム | 悔しさ |
| 喜び | こと |
| 達成 | ゲーム |
| 目標 | 喜び |
| 自分 | 達成 |
| 私 | 目標 |
| # | 自分 |
| とき | 私 |
| 小学生 | # |
| 私 | とき |
| こと | 小学生 |
|  | 私 |

FIG. 6

Similar section 1 = | 私 | 小学生 | とき |

Similar section 2 = | 私 | 自分 | 目標 | 達成 | 喜び | ゲーム | こと | 悔しさ | 経験 |

Similar section 3 = | 経験 |

Similar section 4 = | こと |

Similar section 5 = | ゲーム | こと | 悔しさ | 経験 | 非常 |

FIG. 9B

| nt | ココ | 主張 | こと | 私 | 小学生 | とき | サッカー | 私 | 自分 | 目標 | 達成 | 喜び | ゲーム | こと | 悔しさ | 経験 | 非常 | 経験 | Total |
|---|---|---|---|---|---|---|---|---|---|---|---|---|---|---|---|---|---|---|---|
| Original section flag | T | T | T | F | F | F | T | F | F | F | F | F | F | F | F | F | F | T | |
| Number of characters | 2 | 2 | 2 | 1 | 3 | 2 | 4 | 1 | 2 | 2 | 2 | 2 | 3 | 2 | 3 | 2 | 2 | 2 | 39 |
| Number of characters × Original section flag | 2 | 2 | 2 | 0 | 0 | 0 | 4 | 0 | 0 | 0 | 0 | 0 | 0 | 0 | 0 | 0 | 0 | 2 | 12 |

FIG. 10B

DOCUMENT COMPARISON SYSTEM

CROSS-REFERENCE TO RELATED APPLICATION

This application claims the priority benefit of Japan application serial no. 2019-169708, filed on Sep. 18, 2019. The entirety of the above-mentioned patent application is hereby incorporated by reference herein and made a part of this specification.

BACKGROUND

Technical Field

The disclosure relates to a system for comparing multiple documents.

Description of Related Art

When multiple keywords are extracted in a target document, it has been proposed to store the target document based on a keyword that is a subordinate concept of the keyword that is the most important among the multiple keywords, and the target document is hit when the keyword corresponding to the target document is searched. In addition, a technical method has been proposed in which keywords of the superordinate concept can be appropriately hit (see, for example, Patent Document 1).

RELATED ART

Patent Document

[Patent Document 1] International Publication No. WO 2007-057945

However, when a document is plagiarized, efforts are made to erase the traces of the plagiarism by, for example, changing the word order or parts of words that have similar meaning. Therefore, it is difficult to evaluate how likely it is that one document is created by plagiarizing another document.

Therefore, the disclosure provides a system that can easily calculate a similarity rate of a target document when comparing the target document.

SUMMARY

A document comparison system of the disclosure includes: an arrayed document extraction element which extracts an array set of a designated type of words respectively from a test document Dt and a reference document Dr as an arrayed test document nt and an arrayed reference document nr, respectively; a first proposition definition element which defines a word included in a common word set C of the arrayed test document nt and the arrayed reference document nr extracted by the arrayed document extraction element as true as a proposition and defines other words as false as propositions and which, when a ratio of words defined as true as propositions in a word array of a first designated length including a word among words defined as false as propositions is greater than or equal to a first designated value, redefines the word as a wildcard and as true as a proposition; a comparison word array extraction element which respectively extracts, respectively from the arrayed test document nt and the arrayed reference document nr, a comparison test word array nt* and a comparison reference word array nr* that include an array set of words defined as true as propositions by the first proposition definition element; and a similarity rate calculation element which, when a length of consecutively matching sections in a word array with the word defined as the wildcard viewed as matching all words is greater than or equal to a reference value by comparing the comparison test word array nt* and the comparison reference word array nr* extracted by the comparison word array extraction element, calculates a similarity rate of the test document Dt and the reference document Dr based on at least one of the number of words and the number of characters of each word included in the consecutively matching sections.

BRIEF DESCRIPTION OF THE DRAWINGS

FIG. 3A is an illustration diagram regarding a test document and a reference document.

FIG. 3B is an illustration diagram of an arrayed test document and an arrayed reference document.

FIG. 4 is an illustration diagram of a common word set.

FIG. 5A is an illustration diagram regarding a reference flag and a test flag.

FIG. 5B is an illustration diagram regarding flag replacement (F→T) in the reference flag and the test flag.

FIG. 5C is an illustration diagram regarding flag replacement (T→F) in the reference flag and the test flag.

FIG. 6 is an illustration diagram of a comparison test word array and a comparison reference word array.

FIG. 9B is an illustration diagram regarding similar sections.

FIG. 10B is an illustration diagram regarding a method of calculating a similarity rate.

DESCRIPTION OF THE EMBODIMENTS

Figure 1:
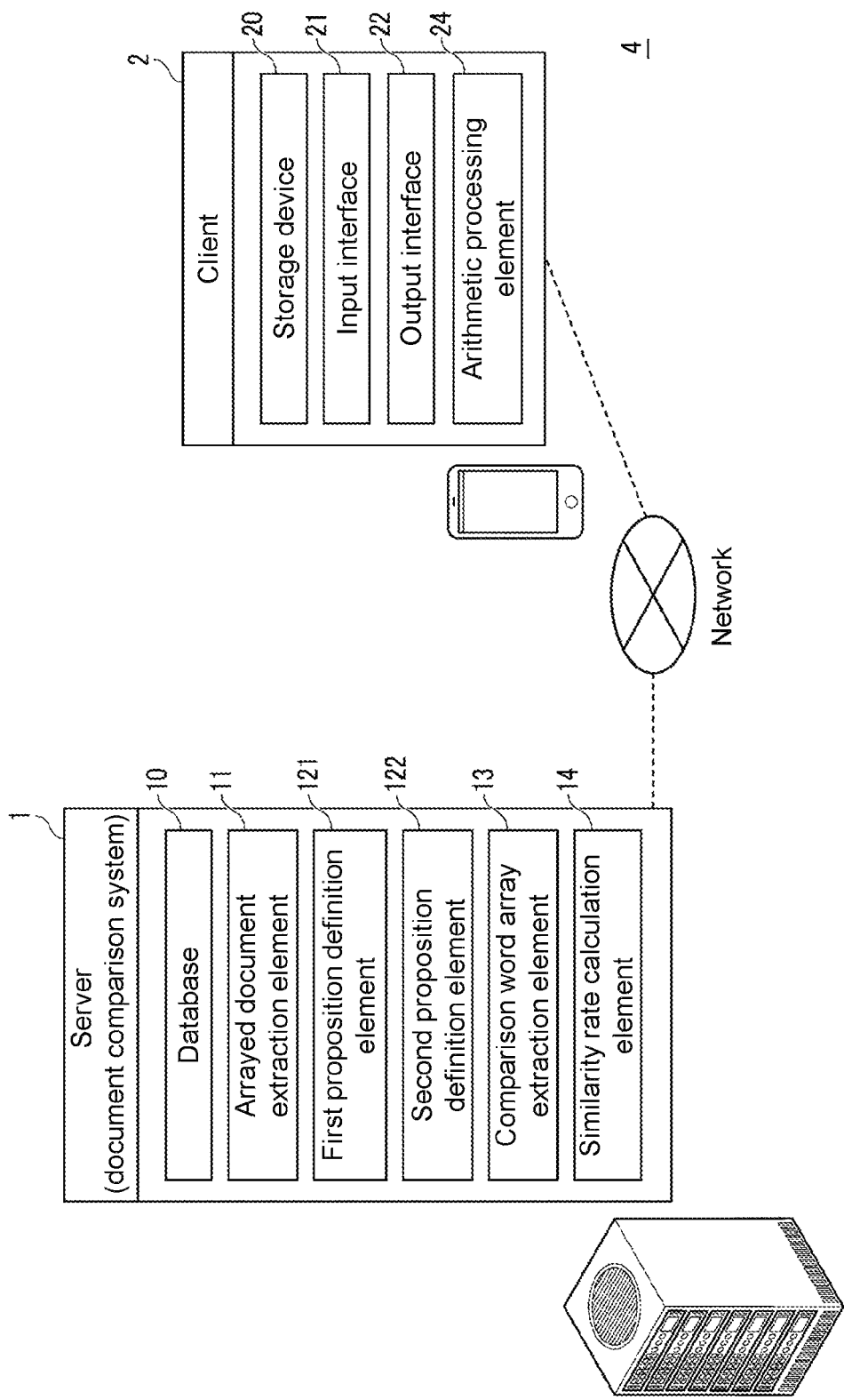
FIG. 1 is an illustration diagram regarding a configuration of a document comparison system according to an embodiment of the disclosure.

In a document comparison system with a configuration according to the disclosure, an array set of a designated type of words is respectively extracted from a test document Dt and a reference document Dr as an arrayed test document nt and an arrayed reference document nr. A word included in a common word set of the arrayed test document nt and the arrayed reference document nr is defined as true as a proposition, and other words are defined as false as propositions.

Further, when a ratio of words defined as true as propositions in a word array of a first designated length including a word among words defined as false as propositions is greater than or equal to a first designated value, the word is redefined as a wildcard and true as a proposition. The "wildcard" means an unspecified word or character that is viewed as matching when compared to any word. In this way, even if there is a possibility that the test document Dt is created by plagiarizing the reference document Dr and partially changing the words and the like of the reference document Dr, it is possible to prevent the possibility of plagiarism or thus the similarity rate from being evaluated as low due to the change.

Then, each of the comparison test word array nt* and the comparison reference word array nr*, which include an array set of words defined as true, are compared. At this time, when the length of consecutively matching sections in the word array with the words defined as wildcards viewed as matching all words is greater than or equal to the reference value, the similarity rate of the test document Dt and the reference document Dr is calculated based on at least one of the number of words and the number of characters of each word included in the consecutively matching sections.

It is preferable that the document comparison system according to the disclosure further includes a second proposition definition element which, for each word included in the common word set C of the arrayed test document nt and the arrayed reference document nr, defines a word as true as a proposition in a case where the word is included in any one similar section of multiple similar sections defined by dividing the consecutively matching sections before and after the word defined as the wildcard, and defines the word as false as a proposition in other cases, and the similarity rate calculation element calculates the similarity rate such that when at least one of the number of words and the number of characters of the words, among the words included in the common word set C, defined as false as propositions by the second proposition definition element is larger, the similarity rate is higher.

In the document comparison system according to the disclosure, it is preferable that the similarity rate calculation element calculates, as the similarity rate, a ratio of at least one of the number of words and the number of characters of the words defined as false as propositions by the second proposition definition element with respect to at least one of the number of words and the number of characters of the words included in the common word set C.

In the document comparison system according to the disclosure, it is preferable that the proposition definition element redefines a word, which is among words defined as true as propositions and which is adjacent only to words defined as false as propositions, as false as a proposition.

In the document comparison system according to the disclosure, it is preferable that the arrayed document extraction element converts a predetermined type of words different from the designated type included in each of the test document Dt and the reference document Dr into the designated type of words and then respectively extracts the arrayed test document nt and the arrayed reference document nr.

(Configuration)

A document comparison system according to an embodiment of the disclosure shown in FIG. 1 is configured by a server 1 that may communicate with a client 2 via a network.

The server 1 includes a database 10, an arrayed document extraction element 11, a first proposition definition element 121, a second proposition definition element 122, a comparison word array extraction element 13, and a similarity rate calculation element 14. The server 1 may be configured by a mobile terminal device such as a smartphone or a tablet.

The database 10 stores and holds a reference document Dr or its original text, a test document Dt or its original text uploaded from the client 2 to the server 1, an evaluation result of a similarity rate Rp, and the like. The database 10 may be configured by a database server separate from the server 1. The arrayed document extraction element 11, the first proposition definition element 121, the second proposition definition element 122, the comparison word array extraction element 13, and the similarity rate calculation element 14 are configured by an arithmetic processing device. The arithmetic processing device reads necessary software and data from a memory and is configured by one or more CPUs that execute designated arithmetic processing on the data as a target according to the software, and is configured by a communication device, a storage device (the memory), and the like according to the needs. Details of the designated arithmetic processing will be described later.

The client 2 is configured by, for example, a portable terminal device such as a smartphone or a tablet. The term "portable" means, for example, that the size is about that of a standard human palm and that the weight may be easily carried with one hand or in a pocket of clothes or the like. The client 2 may be configured by a device that is larger and heavier than a portable device (for example, a device assembled in a vehicle 4).

The client 2 includes a storage device 20, an input interface 21, an output interface 22, and an arithmetic processing element 24.

The storage device 20 is configured to store and hold the arithmetic processing result and the like by the arithmetic processing element 24. The storage device 20 is configured to store map information. The "map information" includes a coordinate sequence representing the position, shape, posture and the like of each link that forms a road and includes link identification information for identifying each link.

The input interface 21 includes operation buttons, a microphone, and the like, and allows a contact-type operation by the user or a non-contact-type operation by speech. The output interface 22 includes a display device and a sound output device (speaker), and displays image contents such as client map information or outputs sound contents. The input interface 21 and the output interface 22 may be configured by a touch panel display.

The arithmetic processing element 24 reads software and data from a designated area of a memory forming the storage device 20 according to the needs, and is configured by an information processing part (CPU) that executes designated arithmetic processing on the data as a target according to the software, and is configured by a communication device, a storage device (the memory), and the like according to the needs.

(Function)

Figure 2:
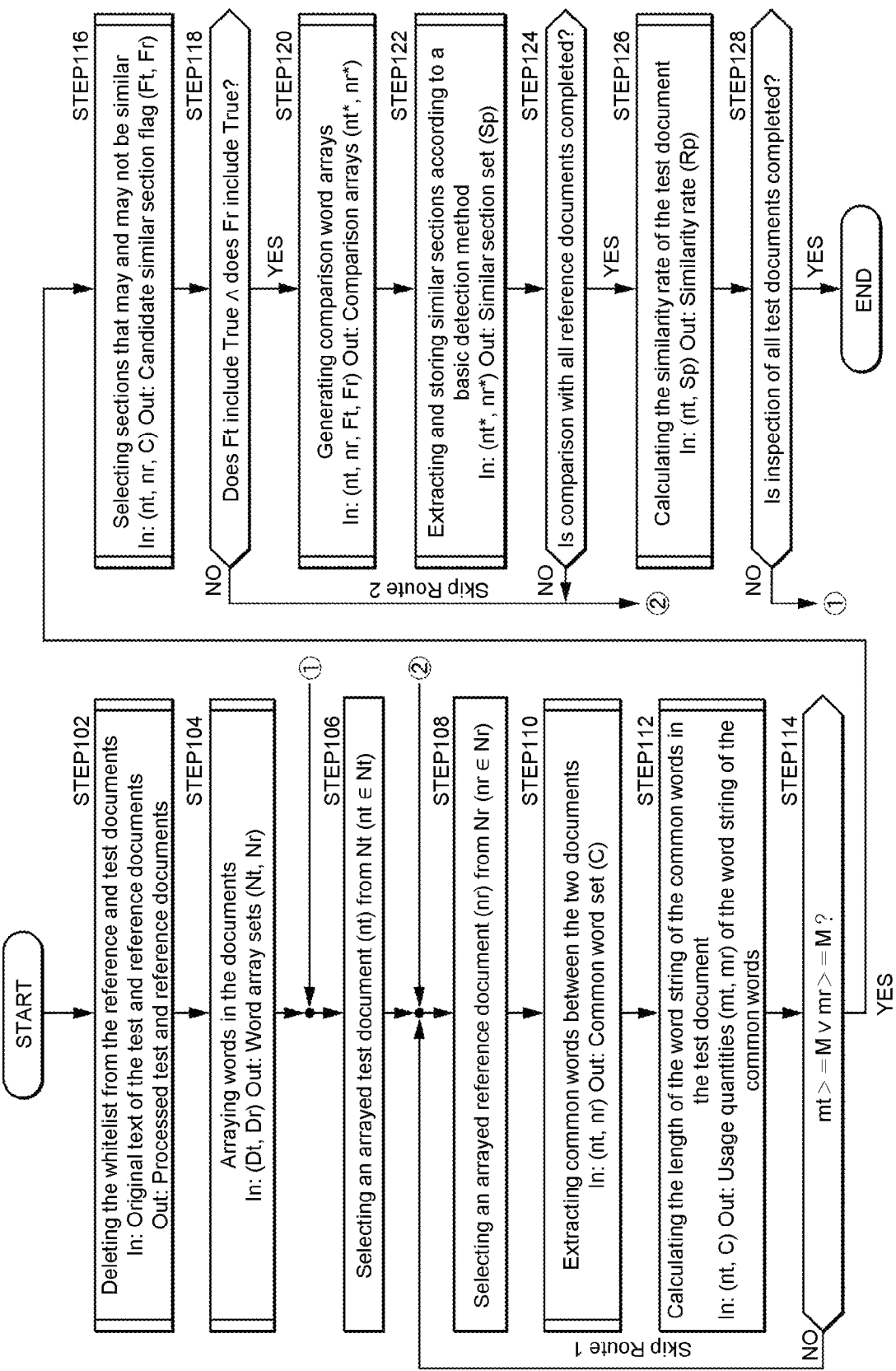
FIG. 2 is an illustration diagram regarding functions of the document comparison system according to an embodiment of the disclosure.

First, the test document Dt and the reference document Dr to be compared are prepared (STEP102 in FIG. 2). For example, the test document Dt and the reference document Dr may be designated in the client 2 through the input interface 21 and uploaded from the client 2 to the server 1. The reference document Dr may be previously uploaded to the server 1 from various clients 2 or document information sources and then registered in the database 10. The test document Dt and the reference document Dr may be respectively extracted from respective different original texts. For example, suppose there is a topic on the thoughts after reading Yukichi Fukuzawa's *Encouragement of Learning*. Naturally, it is expected that the characteristic phrase of this book, the sentence that "heaven does not create one man above or below another man," will be quoted. Since it is a quotation of this sentence, which is different from plagiarism, it is registered in a whitelist in advance. Next, since it has been designated that the expression that "heaven does not create one man above or below another man" is not regarded as plagiarism, this sentence is excluded from the test document and the reference document to prevent it from being detected as a plagiarism section.

As a result, for example, the test document Dt shown in the upper part of FIG. 3A reciting "ここで主張しておきたいことは、私が小\\学生だったとき (The thing that I would like to argue at here is that . . . when I was an elementary school student . . . )" and the reference document Dr shown in the lower part of FIG. 3A reciting "10 年以上前の話になり ますが、私は小学生だったとき (Though being for a story of more than 10 years earlier, . . . when I was an elementary school student . . . )" are selected or extracted as the documents to be compared.

The arrayed document extraction element 11 extracts a word array set respectively from the test document Dt and the reference document Dr (STEP104 in FIG. 2). For example, words are classified into verbs, adjectives, adjectival nouns, nouns (including pronouns), adverbs, adnouns, conjunctions, interjections, auxiliary verbs and particles. As a result, for example, a test word array set Nt including "ここ (here)," "で (at)," "主張 (argue)," "して (to)," "おき たい (would like)," "こと (that)," "は (topic marker)," "私 (I)," "が (subject marker)," "小学生 (elementary school student)," "だった (was)," "とき (when)," and the like is extracted from the test document Dt shown in the upper part of FIG. 3A. Similarly, a reference word array set Nr including "10年 (10 years)," "以上 (more than)," "前 (earlier)," "の (of)," "話 (story)," "に (for)," "なります (being)," "が (though)," "私 (I)," "は (topic marker)," "小学生 (elementary school student)," "だった (was)," "とき (when)," and the like is extracted from the reference document Dr shown in the lower part of FIG. 3A.

At least one of an adjective, an adjectival noun, and a verb may be converted into a noun, and then the word array set may be configured as nouns. For example, the adjective "pretty" included in the document may be changed to the noun "prettiness" by adding the suffix "ness." The adjective "beautiful" included in the document may be changed to the noun "beauty."

The arrayed document extraction element 11 extracts an array set of a designated type of words from the test word array set Nt as an arrayed test document nt (STEP106 in FIG. 2). As a result, for example, a noun array set including "ここ (here)," "主張 (argument)," "こと (that)," "私 (I)," "小学生 (elementary school student)," "とき (when)" and the like as shown in the upper part of FIG. 3B is extracted from the test word array set Nt as the arrayed test document nt.

Similarly, the arrayed document extraction element 11 extracts an array set of a designated type of words from the reference word array set Nr as an arrayed reference document nr (STEP108 in FIG. 2). As a result, for example, a noun array set including "10年 (10 years)," "以上 (more)," "前 (earliness)," "話 (story)," "私 (I)," "小学生 (elementary school student)," "とき (when)" and the like as shown in the lower part of FIG. 3B is extracted from the reference word array set Nr as the arrayed reference document nr. The designated type of words may be adjectives, adjectival nouns, or the like, in addition to nouns.

The first proposition definition element 121 extracts a common word set C of each of the arrayed test document nt and the arrayed reference document nr (STEP110 in FIG. 2). As a result, for example, {私 (I), 小学生 (elementary school student), とき (when), 自分 (myself), 目標 (goal), 達成 (achievement),喜び (joy), ゲーム (game), こと (that), 悔し さ (regret), 経験 (experience)} are extracted as a common word set C (hatched) in the arrayed test document nt shown in the upper part of FIG. 4 and the arrayed reference document nr shown in the lower part of FIG. 4.

The numbers (usage quantities) mt and mr of the common words forming the common word set C included in each of the arrayed test document nt and the arrayed reference document nr are counted (STEP112 in FIG. 2). In the example shown in FIG. 4, the number mt of the common words in the arrayed test document nt is "14," and the number mr of the common words in the arrayed reference document nr is "15."

It is determined whether mt is greater than or equal to a reference value M and whether mr is greater than or equal to the reference value M (STEP114 in FIG. 2). When the determination result is negative (NO in STEP114 in FIG. 2), a series of processes after STEP108 (or STEP104) are repeated for another arrayed reference document nr as the target.

When the determination result is positive (YES in STEP114 in FIG. 2), the first proposition definition element 121 extracts sections in the arrayed test document nt that may be similar to the arrayed reference document nr (STEP116 in FIG. 2).

Specifically, the first proposition definition element 121 defines that in the arrayed test document nt, the words included in the common word set C are true as propositions, and the other words are false as propositions. That is, in the arrayed test document nt, flags T (True: "true" as a proposition) are assigned to the words included in the common word set C (see the hatched sections in FIG. 5A), and flags F (False: "false" as a proposition) are assigned to the other words. As a result, for example, a test flag array Ft {F, F, T, T, T, T, F, T, . . . }, which is an array of the flags as shown in the upper part of FIG. 5A, is generated corresponding to the arrayed test document nt being a word array.

Similarly, the first proposition definition element 121 defines that in the arrayed reference document nr, the words included in the common word set C are true as propositions, and the other words are false as propositions. That is, in the arrayed reference document nr, a reference flag array Fr is generated in which the flags T (True) are assigned to the words included in the common word set C (see the hatched sections in FIG. 5A) and the flags F (False) are assigned to the other words. As a result, for example, the reference flag array Fr {F, F, F, F, F, T, T, T, F, T, T, . . .}, as shown in the lower part of FIG. 5A, is generated corresponding to the arrayed reference document nt being a word array.

The first proposition definition element 121 determines whether the test flag array Ft includes the flag T and whether the reference flag array Fr includes the flag T (STEP118 in FIG. 2). When the determination result is negative (NO in STEP118 in FIG. 2), a series of processes after STEP108 (or STEP104) are repeated for another arrayed reference document nr as the target.

When the determination result is positive (YES in STEP118 in FIG. 2), the comparison word array extraction element 13 generates a comparison test word array nt* and a comparison reference word array nr* (STEP120 in FIG. 2).

Specifically, in the test flag array Ft, when the ratio of words assigned with the flags T in a word array of a first designated length including words assigned with the flags F is a first designated value, the comparison word array extraction element 13 redefines the words assigned with the flags F as words assigned with the flags T, and in the arrayed test document nt, the words assigned with the replacement flags T are replaced with wildcards "#". Accordingly, for example, as shown in the upper part of FIG. 5B, in the test flag array Ft, one (first designated number=1) flag F which has the flags T before and after it is replaced with the flag T, and in the arrayed test document nt, the words "サッカー (soccer)" and "非常 (particularity)" assigned with the replacement flags T are replaced with the wildcards "#" (see the hatched sections).

Similarly, in the reference flag array Fr, when the ratio of words assigned with the flags T in a word array of the first designated length including words assigned with the flags F is the first designated value, the comparison word array extraction element 13 redefines the words assigned with the flags F as words assigned with the flags T, and in the arrayed reference document nr, the words assigned with the redefined flags T are replaced with the wildcards "#". Accordingly, for example, as shown in the lower part of FIG. 5B, in the reference flag array Fr, one flag F which has the flags T before and after it in a word array including 3 words (first designated length=3) is redefined as the flag T (first designated value=2/3), and in the arrayed reference document nr, the words "野球 (baseball)," "これら (these)" and "その後 (following it)" assigned with the replacement flags T are replaced with the wildcards "#" (see the hatched sections).

Further, in the test flag array Ft, when the ratio of words assigned with the flags F in a word array of a second designated length including words assigned with the flags T is a second designated value, the comparison word array extraction element 13 redefines the words assigned with the flags T as words assigned with the flags F.

Similarly, in the reference flag array Fr, when the ratio of words assigned with the flags F in a word array of the second designated length including words assigned with the flags T is the second designated value, the comparison word array extraction element 13 redefines the words assigned with the flags T as words assigned with the flags F. Accordingly, for example, as shown in the lower part of FIG. 5C, in the reference flag array Fr, one flag T which has the flags F before and after it in a word array including 3 words (second designated length=3) is redefined as the flag F (second designated value=2/3) (see the hatched section).

Then, in the test flag array Ft, the comparison word array extraction element 13 deletes a part in which the flags F continue for a predetermined number or more from the arrayed test document nt, and generates the comparison test word array nt*. As a result, for example, as shown in the upper part of FIG. 6, by deleting the part in which the flags F continue for one or more flags (predetermined number=1), the comparison test word array nt* having a smaller size than the original arrayed test document nt is generated. Similarly, in the reference flag array Fr, the comparison word array extraction element 13 deletes a part in which the flags F continue for the predetermined number or more from the arrayed reference document nr, and generates the comparison reference word array nr*. As a result, for example, as shown in the lower part of FIG. 6, by deleting the part in which the flags F continue for one or more flags (predetermined number=1), the comparison reference word array nr* having a smaller size than the original arrayed reference document nr is generated.

Subsequently, similar sections are extracted and recorded according to basic detection method (STEP122 in FIG. 2). Specifically, the second proposition definition element 122 searches for sections where words consecutively match for the reference value M or more as a result of comparing the comparison test word array nt* and the comparison reference word array nr*.

Figure 7A:
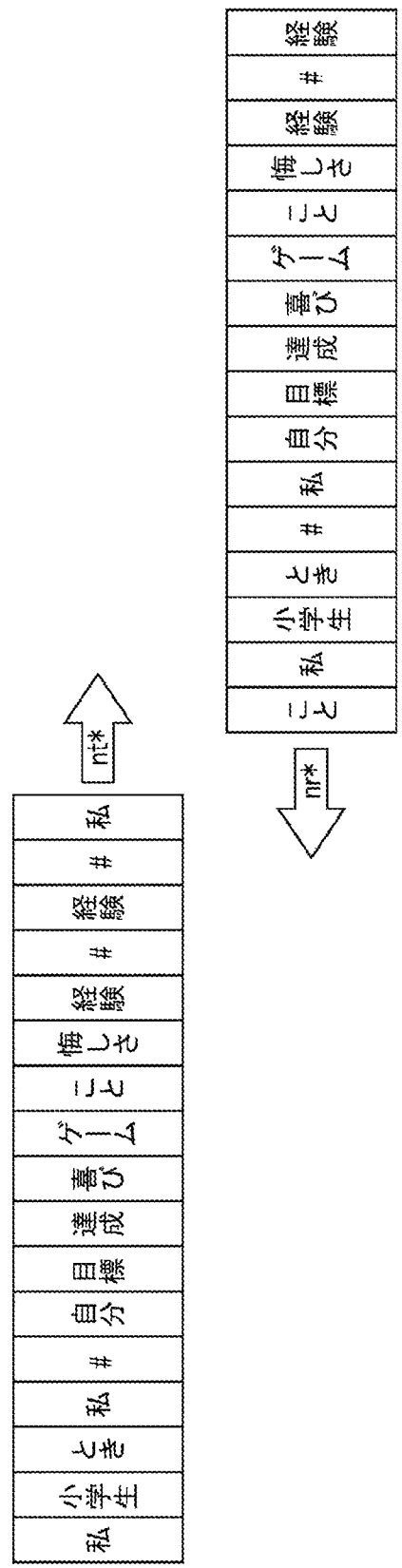
FIG. 7A is an illustration diagram regarding the method of extracting consecutively matching sections.

For example, as shown in FIG. 7A, from the state where the front end of the comparison reference word array nr* is behind the rear end of the comparison test word array nt*, the comparison reference word array nr* is advanced so that each word thereof gradually overlaps the comparison test word array nt*.

Figure 7B:
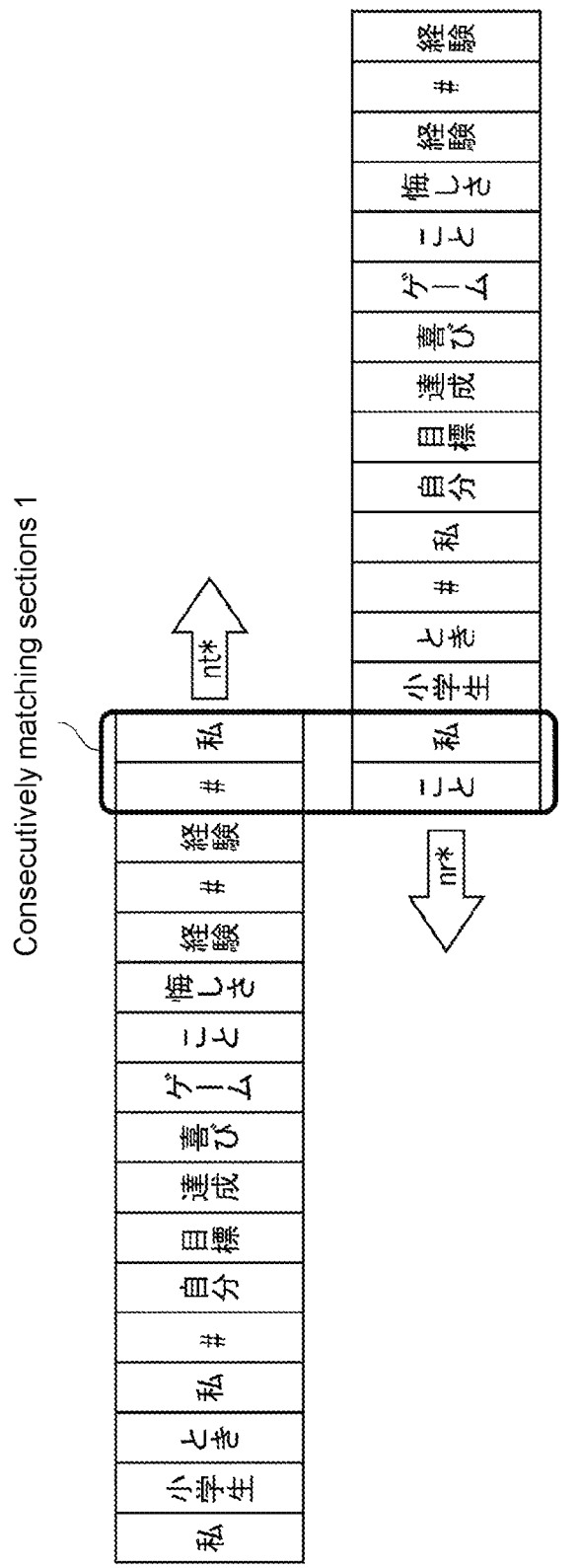
FIG. 7B is an illustration diagram regarding the method of extracting consecutively matching sections.
Figure 7C:
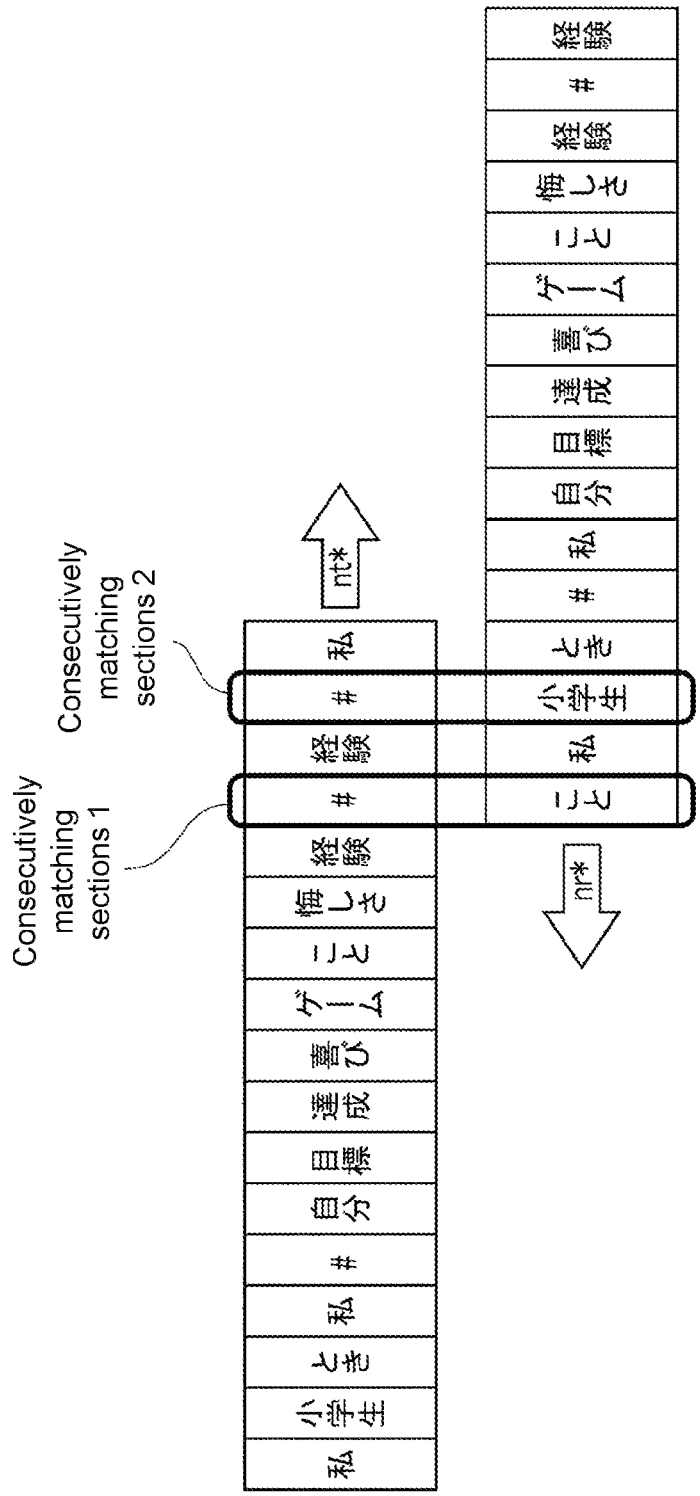
FIG. 7C is an illustration diagram regarding the method of extracting consecutively matching sections.

In the state shown in FIG. 7B, the length of consecutively matching sections in each of the comparison test word array nt* and the comparison reference word array nr* (that is, the number of consecutively matching words) is "2." The words replaced with the wildcards "#" are viewed as matching all the compared words. When the reference value M is "10," the length of the consecutively matching sections is less than the reference value M, and thus the consecutively matching sections are not extracted as candidate similar sections. In the state shown in FIG. 7C, the lengths of two sets of consecutively matching sections in each of the comparison test word array nt* and the comparison reference word array nr* are "1," which are less than the reference value M, and the consecutively matching sections are not extracted as candidate similar sections.

Figure 8A:
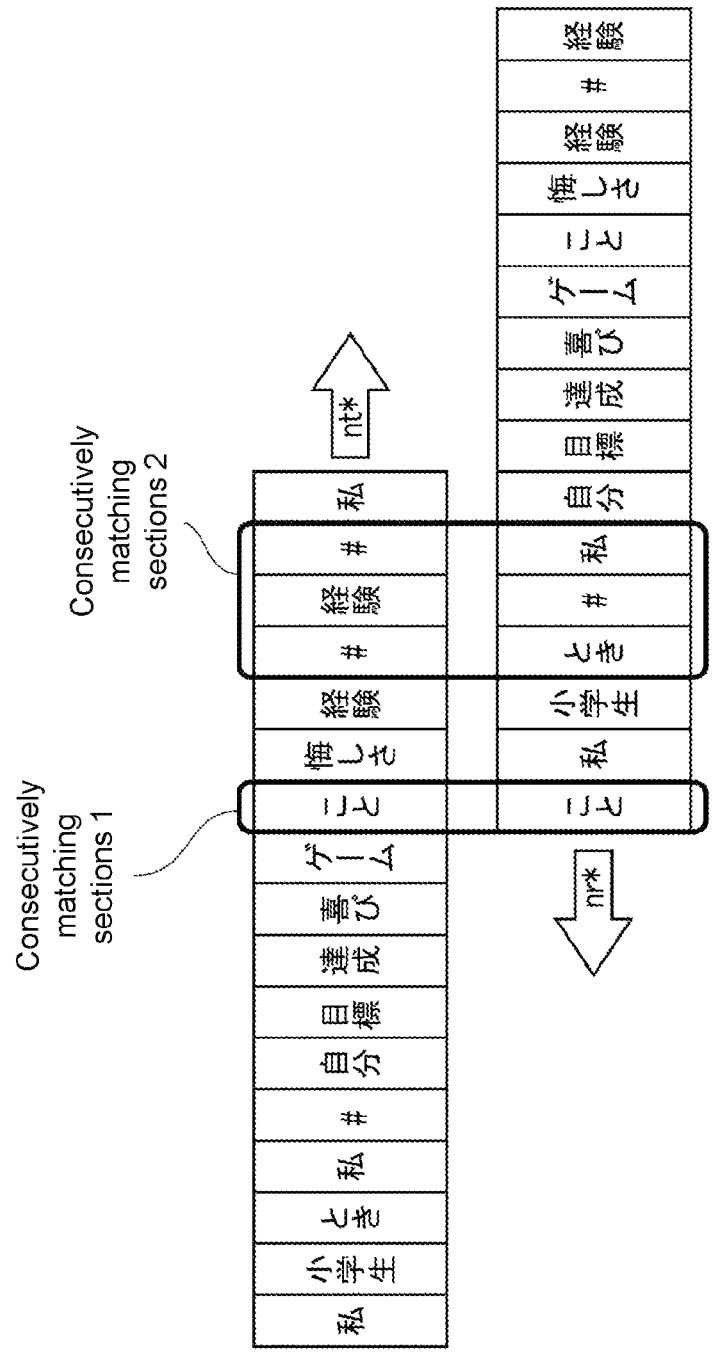
FIG. 8A is an illustration diagram regarding the method of extracting consecutively matching sections.
Figure 8B:
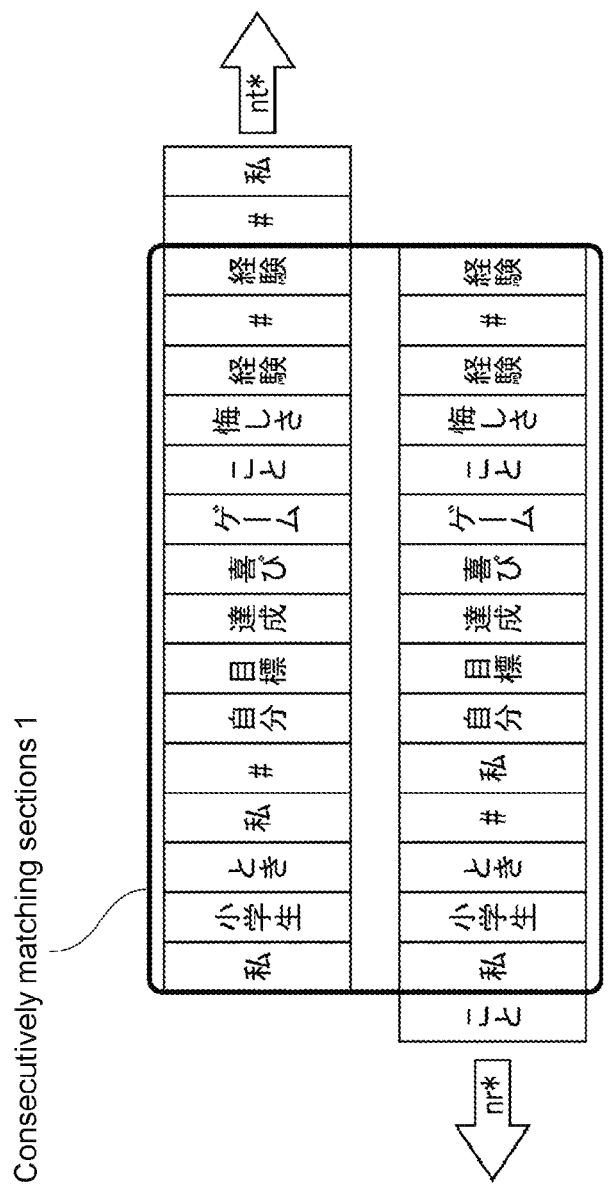
FIG. 8B is an illustration diagram regarding the method of extracting consecutively matching sections.

In the state shown in FIG. 8A, the lengths of two sets of consecutively matching sections in each of the comparison test word array nt* and the comparison reference word array nr* are "1" and "3," which are less than the reference value M, and thus the consecutively matching sections are not extracted as candidate similar sections. On the other hand, in the state shown in FIG. 8B, the length of consecutively matching sections in each of the comparison test word array nt* and the comparison reference word array nr* is "15," which is greater than or equal to the reference value M, and thus the consecutively matching sections are extracted as candidate similar sections.

Figure 9A:
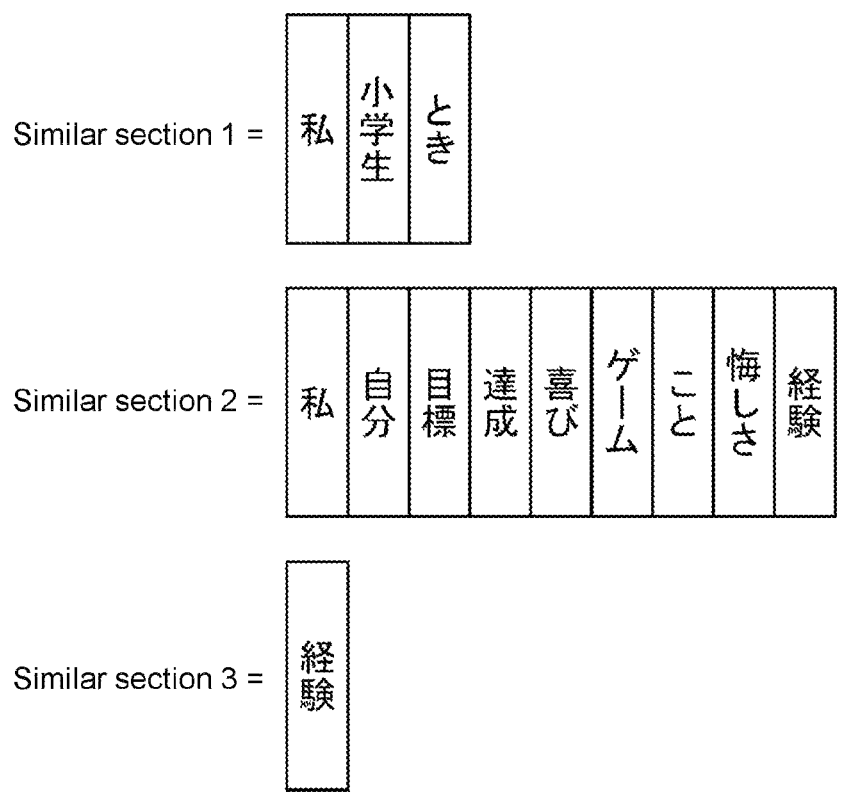
FIG. 9A is an illustration diagram regarding similar sections.

Then, when a wildcard "#" is included in the consecutively matching sections extracted as the candidate similar sections, the second proposition definition element 122 divides the consecutively matching sections at the wildcard "#" section, and the division results are extracted and stored as similar sections. As a result, for example, as shown in FIG. 9A, three similar sections are extracted and registered.

When one similar section is included in another similar section among multiple similar sections registered in the database 10 or the storage device, the second proposition definition element 122 deletes the one similar section from the registration list. For example, as shown in FIG. 9B, when five similar sections are extracted, the similar section 3 is included in the similar section 2, and the similar section 4 is included in each of the similar sections 2 and 5, and then the similar sections 3 and 4 are deleted from the registration list of the similar sections. And output the similar section set Sp.

It is determined whether a series of processes up to extraction of similar sections by reference to each of all reference documents Dr has been executed for one test document Dt (STEP124 in FIG. 2). When the determination result is negative (NO in STEP124 in FIG. 2), a series of processes after STEP108 (or STEP104) are repeated for another arrayed reference document nr as the target.

When the determination result is positive (YES in STEP124 in FIG. 2), the similarity rate calculation element 14 evaluates the similarity rate Rp (STEP126 in FIG. 2).

Figure 10A:
FIG. 10A is an illustration diagram regarding an original section flag.

First, in the arrayed test document nt, the second proposition definition element 122 assigns the flags T to words at sections matching each of multiple similar sections and assigns the flags F to the other words. As a result, for example, as shown in the upper part of FIG. 10A, in the arrayed test document nt, the flags T are assigned to the sections matching each of the similar sections 1, 2 and 5 (see FIG. 9B). In the arrayed test document nt, the words "私 (I)," 小学生 (elementary school student)" and "とき (when)" that match the similar section 1 are assigned with the flags T. In the arrayed test document nt, the words "私 (I)," "自分 (myself)," "目標 (goal)," "達成 (achievement)," "喜び (joy)," "ゲーム (game)," "こと (that)," and "悔しさ (regret)" that match the similar section 2 are assigned with the flags T. In the arrayed test document nt, the words "ゲーム (game)," "こと (that)," "悔しさ (regret)," 経験 (experience)," and "非常 (particularity)" that match the similar section 5 are assigned with the flags T.

Further, the second proposition definition element 122 generates a flag array "original section flag" corresponding to the logical nor of the flags of all similar sections. As a result, as shown in the lower part of FIG. 10A, for the arrayed test document nt {ここ (here), 主張 (argument), こと (that), 私 (I), 小学生 (elementary school student), とき (when), サッカー (soccer), 自分 (myself), 目標 (goal), 達成 (achievement), 喜び (joy), ゲーム (game), こと (that), 悔しさ (regret), 経験 (experience), 非常 (particularity), 経験 (experience)}, the original section flag {T, T, T, F, F, F, T, F, F, F, F, F, F, F, F, F, T} is generated as a logical nor.

This is equivalent to generating the original section flag as a logical disjunction instead of a logical nor. That is, it is equivalent to a case in which, for each of the words included in the common word set C of the arrayed test document nt and the arrayed reference document nr, if a word is included in any one of multiple similar sections defined by dividing consecutively matching sections before and after a word defined as a wildcard (#), it is true (T) as a proposition, and if not, false (F) as a proposition.

Then, the similarity rate calculation element 14 calculates the similarity rate Rp based on the original section flag. For example, as shown in FIG. 10B, a value (=1-12/39=25/39) obtained by subtracting from 1 the ratio (=12/39) of the weighted sum (=12) of the number of characters of the respective words, with the flag T (=1) and the flag F (=0) of the original section flag as weights, to the total length (=39) of the word array of the words included in the arrayed test document nt is calculated as the similarity rate Rp. The calculation result may be transmitted from the server 1 to the client 2 and displayed via the output interface 22 of the client 2. In a case where the original section flag is generated as a logical disjunction instead of a logical nor, the weighted sum of the number of characters of the respective words may be calculated with the flag T (=0) and the flag F (=1) as weights.

The ratio (=12/18) of the number of words (=12) assigned with the flags F of the original section flag to the number of words (=18) included in the arrayed test document nt may be calculated as the similarity rate Rp. Further, the average value (Rp1+Rp2)/2 of a first similarity rate Rp1 (=25/39) based on the number of characters and a second similarity rate Rp2 (=12/18) based on the number of words may be calculated as the similarity rate Rp.

It is determined whether a series of processes up to up the calculation of the similarity rate by reference to each of all reference documents Dr has been executed for all test documents Dt (STEP128 in FIG. 2). When the determination result is negative (NO in STEP128 in FIG. 2), a series of processes after STEP106 (or STEP102) are repeated for another test document Dt as the target. On the other hand, when the determination result is positive (YES in STEP128 in FIG. 2), the series of processes end.

(Action and Effect)

An array set of a designated type of words (e.g., nouns) is respectively extracted from the test document Dt and the reference document Dr as the arrayed test document nt and the arrayed reference document nr, respectively (see STEP106 and STEP108 in FIG. 2, FIG. 3A and FIG. 3B). A word included in the common word set C of the arrayed test document nt and the arrayed reference document nr is defined as true as a proposition, and other words are defined as false as propositions (see STEP116 in FIG. 2, FIG. 4 and FIG. 5A).

Further, when the ratio of words defined as true as propositions in a word array of the first designated length including a word among words defined as false as propositions is greater than or equal to the first designated value, the word is redefined as a wildcard (#) and true as a proposition (see STEP116 in FIG. 2 and FIG. 5B). In this way, even if there is a possibility that the test document Dt is created by plagiarizing the reference document Dr and partially changing the words and the like of the reference document Dr, it is possible to prevent the possibility of plagiarism or thus the similarity rate from being evaluated as low due to the change.

Then, each of the comparison test word array nt* and the comparison reference word array nr*, which include an array set of words defined as true, are compared (see STEP120 and STEP122 in FIG. 2, FIGS. 7A to 7C, and FIGS. 8A to 8B). At this time, when the length of consecutively matching sections in the word array with the words defined as wildcards viewed as matching all words is greater than or equal to the reference value, the similarity rate Rp of the test document Dt and the reference document Dr is calculated based on at least one of the number of words and the number of characters of each word included in the consecutively matching sections (see STEP126 in FIG. 2, FIGS. 9A to 9B and FIG. 10).

What is claimed is:

1. A document comparison system, comprising:
an arrayed document extraction element which extracts an array set of a designated type of words respectively from a test document and a reference document as an arrayed test document and an arrayed reference document, respectively;
a first proposition definition element which defines a word included in a common word set of the arrayed test document and the arrayed reference document extracted by the arrayed document extraction element as true as a proposition and defines other words as false as propositions and which, when a ratio of words defined as true as propositions in a word array of a first designated length including a word among words defined as false as propositions is greater than or equal to a first designated value, redefines the word as a wildcard and as true as a proposition;
a comparison word array extraction element which respectively extracts, respectively from the arrayed test document and the arrayed reference document, a comparison test word array and a comparison reference word array that include an array set of words defined as true as propositions by the first proposition definition element; and
a similarity rate calculation element which, when a length of consecutively matching sections in a word array with the word defined as the wildcard viewed as matching all words is greater than or equal to a reference value by comparing the comparison test word array and the comparison reference word array extracted by the comparison word array extraction element, calculates a similarity rate of the test document and the reference document based on at least one of the number of words and the number of characters of each word included in the consecutively matching sections.

2. The document comparison system according to claim 1, further comprising:

a second proposition definition element which, for each word included in the common word set of the arrayed test document and the arrayed reference document, defines a word as true as a proposition in a case where the word is included in any one similar section of a plurality of similar sections defined by dividing the consecutively matching sections before and after the word defined as the wildcard, and defines the word as false as a proposition in other cases, wherein the similarity rate calculation element calculates the similarity rate such that when at least one of the number of words and the number of characters of the words, among the words included in the common word set, defined as false as propositions by the second proposition definition element is larger, the similarity rate is higher.

3. The document comparison system according to claim 2, wherein the similarity rate calculation element calculates, as the similarity rate, a ratio of at least one of the number of words and the number of characters of the words defined as false as propositions by the second proposition definition element with respect to at least one of the number of words and the number of characters of the words included in the common word set.

4. The document comparison system according to claim 1, wherein the first proposition definition element, when a ratio of words defined as false as propositions in a word array of a second designated length including a word among words defined as true as propositions is greater than or equal to a second designated value, redefines the word as false as a proposition.

5. The document comparison system according to claim 2, wherein the first proposition definition element, when a ratio of words defined as false as propositions in a word array of a second designated length including a word among words defined as true as propositions is greater than or equal to a second designated value, redefines the word as false as a proposition.

6. The document comparison system according to claim 3, wherein the first proposition definition element, when a ratio of words defined as false as propositions in a word array of a second designated length including a word among words defined as true as propositions is greater than or equal to a second designated value, redefines the word as false as a proposition.

7. The document comparison system according to claim 1, wherein the arrayed document extraction element converts a predetermined type of words different from the designated type included in each of the test document and the reference document into the designated type of words and then respectively extracts the arrayed test document and the arrayed reference document.

8. The document comparison system according to claim 2, wherein the arrayed document extraction element converts a predetermined type of words different from the designated type included in each of the test document and the reference document into the designated type of words and then respectively extracts the arrayed test document and the arrayed reference document.

9. The document comparison system according to claim 3, wherein the arrayed document extraction element converts a predetermined type of words different from the designated type included in each of the test document and the reference document into the designated type of words and then respectively extracts the arrayed test document and the arrayed reference document.

10. The document comparison system according to claim 4, wherein the arrayed document extraction element converts a predetermined type of words different from the designated type included in each of the test document and the reference document into the designated type of words and then respectively extracts the arrayed test document and the arrayed reference document.

11. The document comparison system according to claim 5, wherein the arrayed document extraction element converts a predetermined type of words different from the designated type included in each of the test document and the reference document into the designated type of words and then respectively extracts the arrayed test document and the arrayed reference document.

12. The document comparison system according to claim 6, wherein the arrayed document extraction element converts a predetermined type of words different from the designated type included in each of the test document and the reference document into the designated type of words and then respectively extracts the arrayed test document and the arrayed reference document.

\* \* \* \* \*